(12) United States Patent
Tezuka

(10) Patent No.: US 7,783,255 B2
(45) Date of Patent: Aug. 24, 2010

(54) ELECTRONIC APPARATUS AND FIXATION CONTROL METHOD

(75) Inventor: Fumiyoshi Tezuka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/465,535

(22) Filed: May 13, 2009

(65) Prior Publication Data

US 2010/0035544 A1  Feb. 11, 2010

(30) Foreign Application Priority Data

Aug. 6, 2008  (JP)  ............................. 2008-202990

(51) Int. Cl.
*H04B 5/00* (2006.01)
(52) U.S. Cl. ..................... 455/41.1; 455/41.2; 455/557; 455/556.1; 455/418; 455/420; 340/572.1; 340/572.3; 340/572.8; 340/572.9
(58) Field of Classification Search ............... 455/41.1, 455/41.2, 41.3, 418–420, 556.1–556.2, 557, 455/558, 569.1; 340/572.8, 572.9, 572.1, 340/572.3, 572.4, 693.9
See application file for complete search history.

(56) References Cited

U.S. PATENT DOCUMENTS

| 5,201,066 A | | 4/1993 | Kim |
| 5,960,208 A | * | 9/1999 | Obata et al. ................. 713/330 |
| 5,969,888 A | * | 10/1999 | Sukekawa .................... 359/821 |
| 6,295,462 B1 | * | 9/2001 | Kudoh ......................... 455/41.3 |
| 6,646,555 B1 | * | 11/2003 | Forster et al. ............. 340/572.8 |
| 7,577,402 B2 | * | 8/2009 | Fukuoka .................... 455/41.2 |
| 2007/0216530 A1 | | 9/2007 | Fukuoka |

FOREIGN PATENT DOCUMENTS

| JP | 2002-123804 | 4/2002 |
| JP | 2004-249590 | 9/2004 |
| WO | WO 2005/014959 A1 | 2/2005 |

OTHER PUBLICATIONS

Notice of Reasons for Rejection for the Japanese patent application No. 2008-202990 mailed by Japan Patent Office on Jul. 14, 2009. Explanation of Non-English Language Reference(s).

* cited by examiner

*Primary Examiner*—Tuan A Tran
(74) *Attorney, Agent, or Firm*—Knobbe, Martens, Olson & Bear LLP

(57) ABSTRACT

According to one embodiment, an electronic apparatus includes an antenna for close proximity wireless transfer, a fixing module which is provided near the antenna and fixes an other apparatus to the own apparatus, a data communication module which executes data communication with the other apparatus by close proximity wireless transfer via the antenna, a communication state detection module which detects a communication state of communication with the other apparatus by the data communication module, and a fixation control module which controls fixation of the other apparatus by the fixing module in accordance with the communication state which is detected by the communication state detection module.

10 Claims, 6 Drawing Sheets

ELECTRONIC APPARATUS AND FIXATION CONTROL METHOD

CROSS-REFERENCE TO RELATED APPLICATIONS

This application is based upon and claims the benefit of priority from Japanese Patent Application No. 2008-202990, filed Aug. 6, 2008, the entire contents of which are incorporated herein by reference.

BACKGROUND

1. Field

One embodiment of the invention relates to an electronic apparatus which executes close proximity wireless transfer and a fixation control method.

2. Description of the Related Art

Conventionally, there is known an electronic apparatus with a function of wirelessly executing near-field communication, which starts communication by being positioned near some other apparatus that is a counterpart of communication (e.g. Jpn. Pat. Appln. KOKAI Publication No. 2002-123804).

A near-field communication system disclosed in Jpn. Pat. Appln. KOKAI Publication No. 2002-123804 comprises an information storage apparatus which wirelessly outputs information in response to an inquiry by radio, and an inquiry apparatus which sends an inquiry by radio to the information storage apparatus and receives information which is wirelessly sent from the information storage apparatus in reply. The information storage apparatus and the inquiry apparatus are provided with members which cause mutual attraction functions when both apparatuses are positioned close to each other. For example, the information storage apparatus is provided with a magnetically sensitive module which displaces its position in response to a magnetic field which is generated by the information storage apparatus.

By positioning the inquiry apparatus close to the information storage apparatus, the magnetically sensitive module that is provided on the information storage apparatus is displaced. Thus, in the case where there are a plurality of objects on which information storage apparatuses are attached, it can be confirmed that the magnetically sensitive module of the information storage apparatus, which is attached to a specified object, is displaced. Therefore, by positioning the inquiry apparatus to a specified one of the plural information storage apparatuses so that the magnetically sensitive module of the specified information storage apparatus may be set in a displaced state, the inquiry apparatus can be set in the state in which the inquiry apparatus can communicate with only the specified information storage apparatus.

As has been described above, in the conventional system, by positioning the inquiry apparatus close to the information storage apparatus, the magnetically sensitive module that is provided on the information storage apparatus is displaced by magnetic force, and the specified information storage apparatus that is the object of information can be captured.

In the conventional system, however, even if the object of communication is successfully captured, the positional relationship between the inquiry apparatus and the information storage apparatus cannot be stabilized. Specifically, if the inquiry apparatus is moved away from the specified information storage apparatus after the inquiry apparatus is positioned close to the specified information storage apparatus and the communication is started therebetween, the communication between the inquiry apparatus and the information storage apparatus would be interrupted.

Besides, in the case of executing data communication between the electronic apparatuses, the optimal near-field state between the apparatuses varies depending on the condition of communication with the counter-part apparatus of communication. For example, in the case where the data transfer size is small or the communication type is a type with short communication time, the time for maintaining the near-field state between the electronic apparatuses may be short. Conversely, in the case where the data transfer size is large or the communication type is a type with long communication time (e.g. data transfer of a large capacity storage apparatus), the near-field state between the electronic apparatuses has to be maintained for a long time.

As has been described above, in the conventional system, in the case of executing data communication by near-field wireless communication, it is not possible to set the near-field state that is optimal for the condition of communication with the counterpart apparatus of communication.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an electronic apparatus comprising: an antenna for close proximity wireless transfer; a fixing module which is provided near the antenna and fixes an other apparatus to the own apparatus; a data communication module which executes data communication with the other apparatus by close proximity wireless transfer via the antenna; a communication state detection module which detects a communication state of communication with the other apparatus by the data communication module; and a fixation control module which controls fixation of the other apparatus by the fixing module in accordance with the communication state which is detected by the communication state detection module.

An embodiment of the present invention will now be described with reference to the accompanying drawings.

To begin with, referring to FIG. 1A, FIG. 1B, FIG. 2 and FIG. 3, the structure of an electronic apparatus according to the embodiment of the invention is described. The electronic apparatus of the present embodiment is realized, for example, by a notebook personal computer 10 or a digital camera 25 shown in FIG. 1A and FIG. 1B. A description is given below of the case of executing close proximity wireless transfer between the personal computer 10 and the digital camera 25.

The electronic apparatus of the present invention is not limited to the personal computer 10 or digital camera 25. The electronic apparatus may be any kind of apparatus including a processor for executing programs, such as a mobile phone, a PDA (personal digital assistant), a portable audio/video player, a digital video camera, or a portable car navigation apparatus.

Figures 1A, 1B:
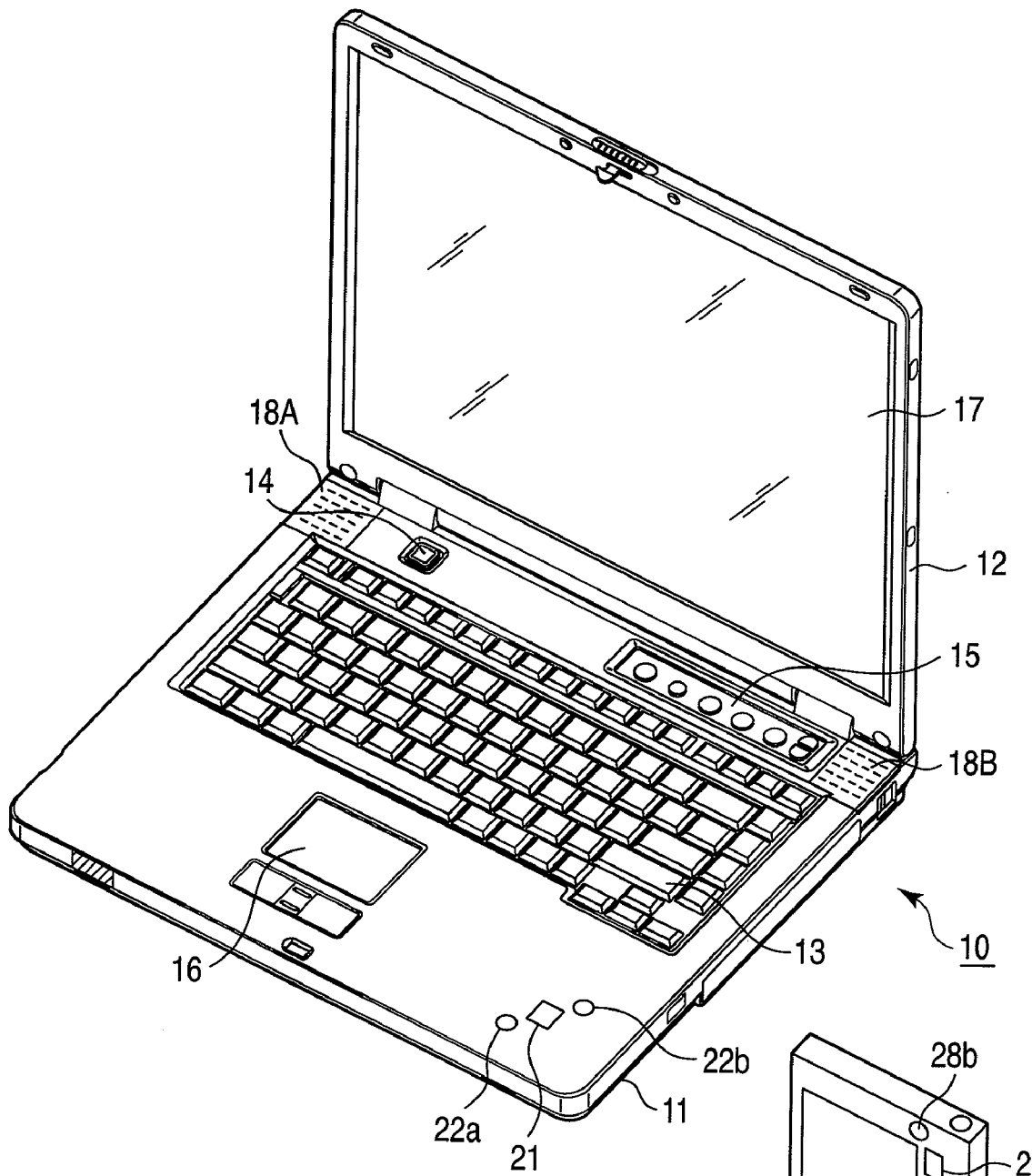
FIG. 1A is an exemplary view showing the external appearance of a personal computer which is an electronic apparatus in an embodiment of the invention.
FIG. 1B is an exemplary view showing the external appearance of a digital camera in the embodiment.

FIG. 1A is a perspective view showing the state in which a display unit of the computer 10 is opened. The computer 10 comprises a computer main body 11 and a display unit 12. A display device that is composed of an LCD (Liquid Crystal Display) 17 is built in the display unit 12.

The display unit 12 is attached to the computer main body 11 such that the display unit 12 is freely rotatable between an open position where the top surface of the computer main body 11 is exposed and a closed position where the top surface of the computer main body 11 is covered. The computer main body 11 has a thin box-shaped casing. A keyboard 13, a power button 14 for power-on/power-off, an input operation panel 15, a touch pad 16 and speakers 18A and 18B are disposed on the top surface of the computer main body 11.

The input operation panel 15 is an input device for inputting an event corresponding to a pressed button. The input operation panel 15 includes a plurality of buttons for activating a plurality of functions.

Figures 4A, 4B:
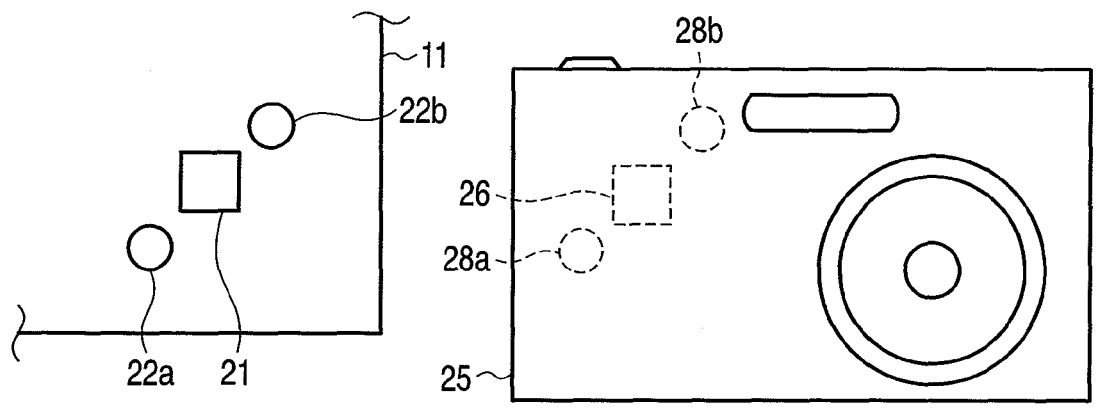
FIG. 4A is an exemplary view showing the disposition of a wireless communication antenna and a plurality of fixing devices, which are provided on the computer main body in the embodiment.
FIG. 4B is an exemplary view showing the positional relationship between a wireless communication antenna and a plurality of fixing devices, which are provided on a digital camera in the embodiment.

In addition, a wireless communication antenna 21 is provided on a top surface portion of the computer main body 11. The personal computer 10 is equipped with a close proximity wireless transfer function for executing wireless communication with some other electronic apparatus in the state in which the personal computer 10 is closed to this other electronic apparatus. The personal computer 21 executes data communication with the other electronic apparatus via the wireless communication antenna 21. In the vicinity of the wireless communication antenna 21, there are disposed a plurality of fixing devices 22a and 22b for fixing the other apparatus (e.g. digital camera 25), which is the object of close proximity wireless transfer, to the own apparatus. The plural fixing devices 22a and 22b are disposed, for example, such that the wireless communication antenna 21 is interposed therebetween (the details are shown in FIG. 4A).

On the other hand, the digital camera 25 shown in FIG. 1B is equipped with a close proximity wireless transfer function for executing wireless communication with the personal computer 10 in the state in which the digital camera 25 is positioned near the personal computer 10. In the digital camera 25, for example, a wireless communication antenna 26 is disposed on a back-side casing (usually, on the side where the display is provided). Like the personal computer 10, in the digital camera 25, a plurality of fixing devices 28a and 28b for fixing the positional relationship between the digital camera 25 and some other apparatus (e.g. personal computer 10), which is the object of close proximity wireless transfer, are disposed in the vicinity of the wireless communication antenna 26. Like the fixing devices 22a and 22b that are provided on the personal computer 10, the plural fixing devices 28a and 28b are disposed, for example, such that the wireless communication antenna 26 is interposed therebetween (the details are shown in FIG. 4B).

The relative positional relationship between the wireless communication antenna 26 and fixing devices 28a and 28b provided on the digital camera 25 is symmetric to the relative positional relationship between the wireless communication antenna 21 and fixing devices 22a and 22b that are provided on the personal computer 10. Specifically, if the wireless communication antenna 26 of the digital camera 25 is closely opposed to the wireless communication antenna 21 of the personal computer 10, the fixing devices 22a and 22b are opposed to the fixing devices 28a and 28b.

Figure 2:
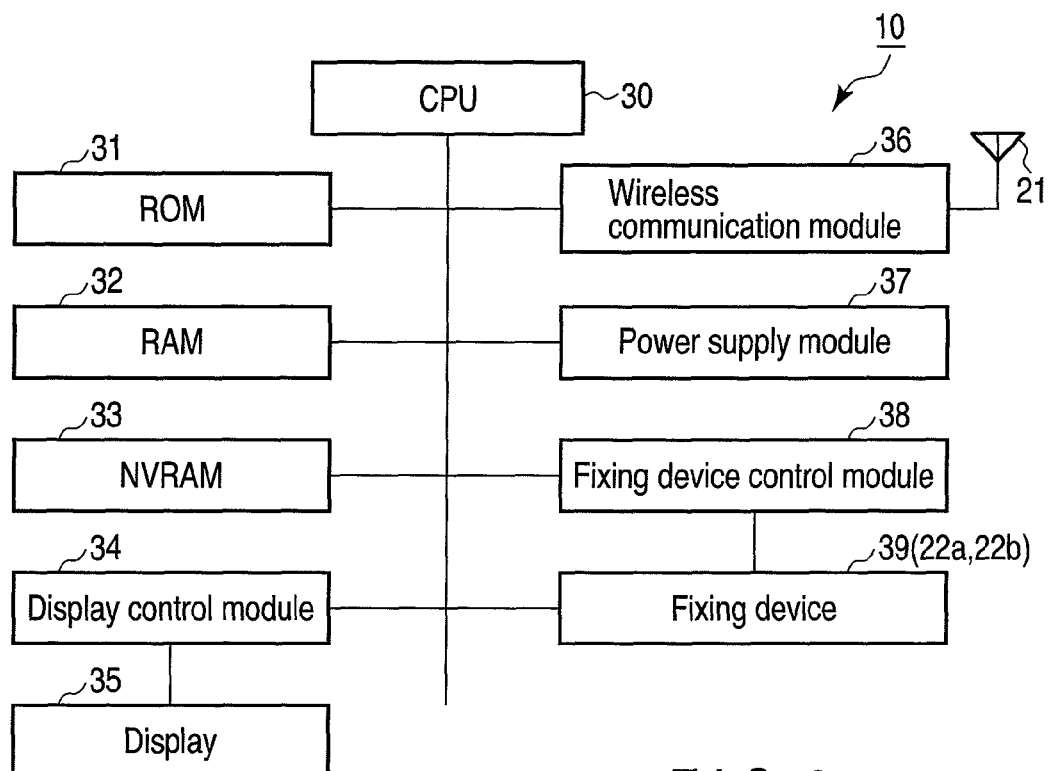
FIG. 2 is an exemplary block diagram showing a main structure of the personal computer in the embodiment.

FIG. 2 is a block diagram showing a main structure of the personal computer 10 in the embodiment.

The personal computer 10 in the present embodiment is equipped with a close proximity wireless transfer function for executing high-speed wireless communication with some other apparatus in the state in which the personal computer 10 is positioned near this other apparatus. When the personal computer 10 executes close proximity wireless transfer with the digital camera 25, the personal computer 10 fixes itself to the digital camera 25 in accordance with the condition of communication by means of the fixing devices 22a and 22b, thereby providing to the user the optimal near-field communication condition for the communication condition.

As shown in FIG. 2, the personal computer 10 is provided with a CPU 30, a ROM 31, a RAM 32, an NVRAM (Non-volatile RAM) 33, a display control module 34, a display 35, a wireless communication module 36 (wireless communication antenna 21), a power supply module 37, a fixing device control module 38, and a fixing device 39 (22a, 22b).

The CPU 30 executes an overall control of the apparatus according to programs. The CPU 30 executes a data communication program to realize a data communication function for controlling data communication, executes a communication control program to realize a close proximity wireless transfer control function for controlling close proximity wireless transfer by the wireless communication module 36, and executes a fixation control program to realize a fixation control function 41 for controlling the driving of the fixing device 39 (22a, 22b) by the fixing device control module 38.

The ROM 31 stores various programs and data.

The RAM 32 temporarily stores various programs, which are executed by the CPU 30, and various data.

The NVRAM 33 stores various setting data, and data which is processed by various programs.

The display control module 34, under the control of the CPU 30, controls display on the display 35.

The display 35 is composed of, e.g. an LCD (Liquid Crystal Display), and displays information relating to the usual process by the personal computer 10.

The wireless communication module 36, under the control (close proximity wireless transfer control function) of the CPU 30, executes close proximity wireless transfer with some other apparatus. In the close proximity wireless transfer by the wireless communication module 36, for example, high-speed wireless communication, which is purpose-specific for peer-to-peer (P2P) communication, is executed. The wireless communication module 36 can execute wireless communication in a case where the communication distance between a wireless communication antenna 21, which is mounted in the casing, and an antenna, which is provided in the other apparatus, is, e.g. 30 mm or less. The wireless communication antenna 21 is a wireless antenna which uses an induction electric field. The wireless antenna which uses an induction electric field has such characteristics that a high gain is obtained in a near-field range and the gain sharply decreases as the distance increases.

The power supply module 37 supplies power to the respective components.

The fixing device control module 38, under the control (fixation control function) of the CPU 30, controls the driving of the fixing device 39 in order to fix the other apparatus, which is the counterpart of communication, to the own apparatus. In the present embodiment, the fixing device 39 is composed of an electromagnet, and the fixing device control module 38 can control the generation/stop of the magnetic force by the fixing device 39, and the magnitude of the magnetic force.

The fixing device 39 is composed of, for example, an electromagnet, and generates a magnetic force under the control of the fixing device control module 38. The fixing device 39 attracts, for example, a metallic member, which is provided on the fixing device of the other apparatus and is attracted by a magnet. The fixing device 39 is coupled, by the magnetic force, to the fixing device that is provided on the other apparatus, thereby fixing the other apparatus to the casing of the personal computer 10 so that their positional relationship is not varied.

In the meantime, the structure of the fixing device 39 is not limited to the structure in which the fixing device 39 is composed of an electromagnet. The fixing device 39 may be configured to fix the other apparatus, which is the counterpart of close proximity wireless transfer, to the own apparatus by other methods. For example, the fixing device 39 may be configured to attract the other apparatus by air suction, or may be configured to mechanically fix the other apparatus. No matter which of structures is adopted, it is preferable to make the strength of fixation adjustable (variable).

Figure 3:
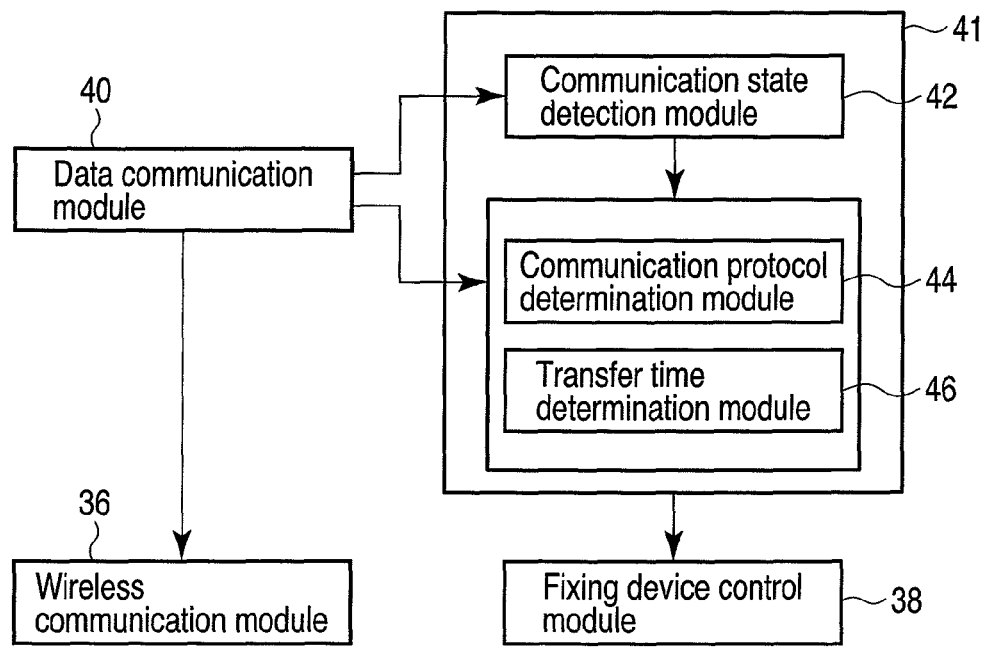
FIG. 3 is an exemplary block diagram showing the structure of functions which are realized by a data communication program and a fixation control program.

FIG. 3 is a block diagram showing the structure of functions which are realized by the data communication program and fixation control program.

In the personal computer 10, the CPU 30 executes the data communication program, thereby realizing a data communication module 40. The data communication module 40 executes data communication with the other apparatus by close proximity wireless transfer via the wireless communication antenna 21. The data communication module 40 executes data communication with the other apparatus in accordance with a communication protocol corresponding to the type of data communication which meets the user's request. For example, in the case where file transfer is requested by the user, the data communication module 40 controls data communication in accordance with an OBEX protocol as a communication protocol for file transfer. If the wireless communication antenna 21 is positioned close to the wireless communication antenna 26 of the other apparatus (e.g. digital camera 25) within a communicable distance (e.g. 30 mm), the data communication module 40 is set in the state in which close proximity wireless transfer is enabled via the wireless communication module 36.

In addition, in the personal computer 10, the CPU 30 executes the fixation control program, thereby realizing a communication state detection module 42, a communication protocol determination module 44 and a transfer time determination module 46 as the fixation control function 41.

The communication state detection module 42 detects the state of communication with the other apparatus by the data communication module 40, that is, the start/end of the data communication.

The communication protocol determination module 44 determines the communication protocol corresponding to the type of data communication by the data communication module 40. For example, in the case where file transfer is executed by the data communication module 40, the communication protocol determination module 44 receives from the data communication module 40 a report to the effect that data communication by the OBEX protocol for file transfer is to be executed. On the basis of the report from the data communication module 40, the communication protocol determination module 44 determines the communication protocol.

In the case where the data transfer size can be determined in the communication protocol for executing the data communication by the data communication module 40, the transfer time determination module 46 receives a report on the data transfer size from the data communication module 40. The transfer time determination module 46 determines the transfer time on the basis of the data transfer size.

The fixation control function 41 controls the fixing device control module 38 in accordance with communication conditions, such as the start/end of data communication by the data communication module 40, which is detected by the communication state detection module 42, the communication protocol which is determined by the communication protocol determination module 44, and the data transfer time which is determined by the transfer time determination module 46. In short, the fixation control function 41 adjusts the operation for fixing the other apparatus to the own apparatus by the fixing device 39 (22a, 22b).

Next, a detailed description is given of the arrangements between the wireless communication antenna 21, 26 and the fixing device 22a, 22b, 28a, 28b, which are disposed on the personal computer 10 and digital camera 25.

FIG. 4A shows the arrangement between the wireless communication antenna 21 and the plural fixing devices 22a and 22b, which are provided on the computer main body 11. The wireless communication antenna 21 is attached to an upper surface portion of the computer main body 11. For example, it is assumed that the wireless communication antenna 21 is amounted on a surface of the casing or on an inner side of the casing. The surface of the casing, where the wireless communication antenna 21 is disposed, is formed in a predetermined shape or is provided with a mark, thereby to enable the user to recognize the position of the antenna 21 from the outside. As shown in FIG. 4A, the two fixing devices 22a and 22b are disposed, for example, on a diagonal line, with the wireless communication antenna 21 being interposed between the fixing devices 22a and 22b.

FIG. 4B shows the positional relationship of the wireless communication antenna 26 and the fixing devices 28a and 28b, which are provided on the digital camera 25. As shown in FIG. 4B, the wireless communication antenna 26 and the fixing devices 28a and 28b are provided, for example, on the back side of the digital camera 25 (as indicated by broken lines). As shown in FIG. 4A and FIG. 4B, the positional relationship between the wireless communication antenna 26 and the fixing devices 28a and 28b is the same as that between the wireless communication antenna 21 and the fixing devices 22a and 22b which are provided on the personal computer 10. Accordingly, if the wireless communication antenna 26 of the digital camera 25 is moved close to the wireless communication antenna 21 of the personal computer 10, the fixing devices 28a and 28b are opposed to the fixing devices 22a and 22b of the personal computer 10 and these fixing devices attract each other.

By the fixing devices 22a, 22b, 28a and 28b, each of the personal computer 10 and digital camera 25 fixes the counterpart of communication to the own apparatus, and the positional relationship between the personal computer 10 and digital camera 25 is fixed. In addition, since the wireless communication antenna 21, 26 is disposed such that the wireless communication antenna 21, 26 is interposed between the fixing devices 22a, 22b, 28a, 28b, the wireless communication antenna 21 and wireless communication antenna 26 are aligned and opposed to each other, and are fixed in close contact, by the mutual attraction between the fixing devices 22a and 22b and the fixing devices 28a and 28b. Therefore, the near-field state between the wireless communication antenna 21 and wireless communication antenna 26 at the time of data communication can be stabilized.

In the case where two fixing devices 22a and 22b are disposed in association with one wireless communication antenna 21 on the personal computer 10, one fixing device 22a may be configured to attract the associated fixing device of the other apparatus, and the other fixing device 22b may be configured to be attracted by the associated fixing device of the other apparatus that is the counterpart of communication.

For example, the fixing device 22a of the personal computer 10 attracts the fixing device 28a of the digital camera 25 by generating magnetic force, and the fixing device 28b of the digital camera 25 attracts the fixing device 22b of the personal computer 10 by generating magnetic force. In this case, even if a plurality of fixing devices are disposed, it should suffice to execute driving control for one fixing device alone, and the structure can be simplified.

In addition, the fixing devices 22a and 22b, which are provided on the relatively large personal computer 10, may be configured to function to attract the fixing devices 28a and 28b of the other apparatus, and the fixing devices 28a and 28b of the small portable electronic apparatus, such as digital camera 25, may be formed of metallic material which is attracted by the fixing devices 22a and 22b of the personal computer 10. Thereby, the mounting of the fixing devices on the small-sized electronic apparatus can be made easy.

Furthermore, in the structure shown in FIG. 1A, FIG. 1B, FIG. 4A, and FIG. 4B, the two fixing devices 22a and 22b are provided in association with the single wireless communication antenna 21. Alternatively, three or more fixing devices may be disposed. In this case, the three or more fixing devices should preferably be disposed in a manner to surround the wireless communication antenna 21.

Besides, in FIG. 1A, FIG. 1B, FIG. 4A, and FIG. 4B, each of the fixing devices 22a and 22b has a circular plan-view shape. Alternatively, the fixing devices 22a and 22b may have other shapes. In this case, it is possible to adopt such a structure that a single fixing device is provided, if the shape of this fixing device that is disposed on the computer main body 11 can specify the position of the wireless communication antenna 21 relative to the fixing device.

Figure 5:
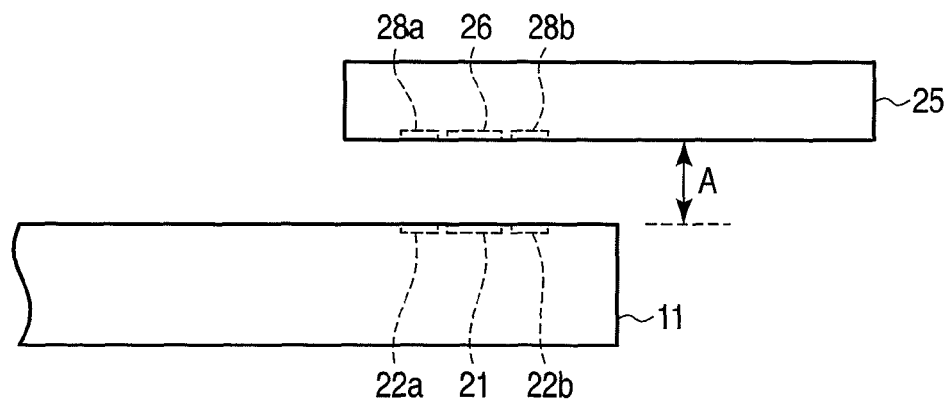
FIG. 5 is an exemplary view showing the state in which the wireless communication antenna of the digital camera is positioned close to the wireless communication antenna of the personal computer in the present embodiment.

FIG. 5 shows the state in which the wireless communication antenna 26 of the digital camera 25 is positioned close to the wireless communication antenna 21 of the personal computer 10.

As shown in FIG. 5, when the wireless communication antenna 21 is opposed to the wireless communication antenna 26, the fixing devices 22a and 22b are opposed to the fixing devices 28a and 28b. If the digital camera 25 is positioned close to the personal computer 10 within a distance A in which close proximity wireless transfer is enabled, the digital camera 25 and personal computer 10 can be set in the communicable state. Since the wireless communication antenna 21 makes use of induction electric field, a high gain can be obtained at the distance in which close proximity wireless transfer is enabled (e.g. 30 mm), and the state in which close proximity wireless transfer is enabled can be detected.

In the present embodiment, if the personal computer 10 and digital camera 25 are set in the state in which close proximity wireless transfer is enabled, the personal computer 10 and digital camera 25 drive the fixing devices 22a, 22b, 28a and 28b to attract the counterpart apparatus of communication.

Figure 6:
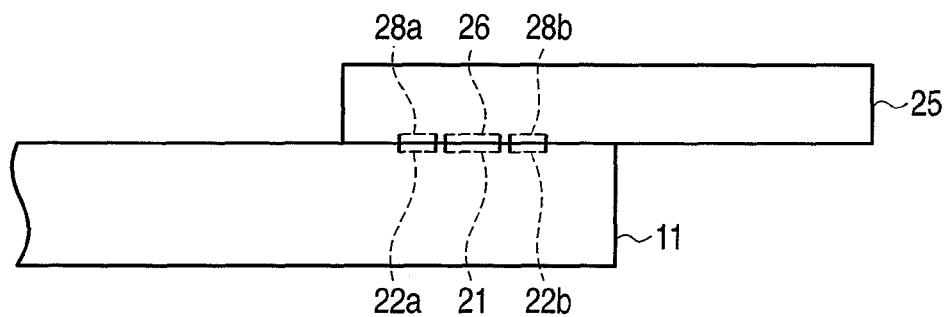
FIG. 6 is an exemplary view showing the state in which each of the personal computer and the digital camera in the embodiment fixes the counterpart apparatus of communication to the own apparatus.

FIG. 6 shows the state in which each of the personal computer 10 and the digital camera 25 fixes the counterpart apparatus of communication to the own apparatus.

As shown in FIG. 6, the fixing device 22a and fixing device 28a are mutually opposed and fixed, and the fixing device 22b and fixing device 28b are mutually opposed and fixed. Thus, the close proximity wireless transfer antennas 21 and 26 are fixed in the neighboring state (in the close contact state in this example).

Next, the fixation control process by the personal computer 10 of the present embodiment is described with reference to flow charts.

Figure 7:
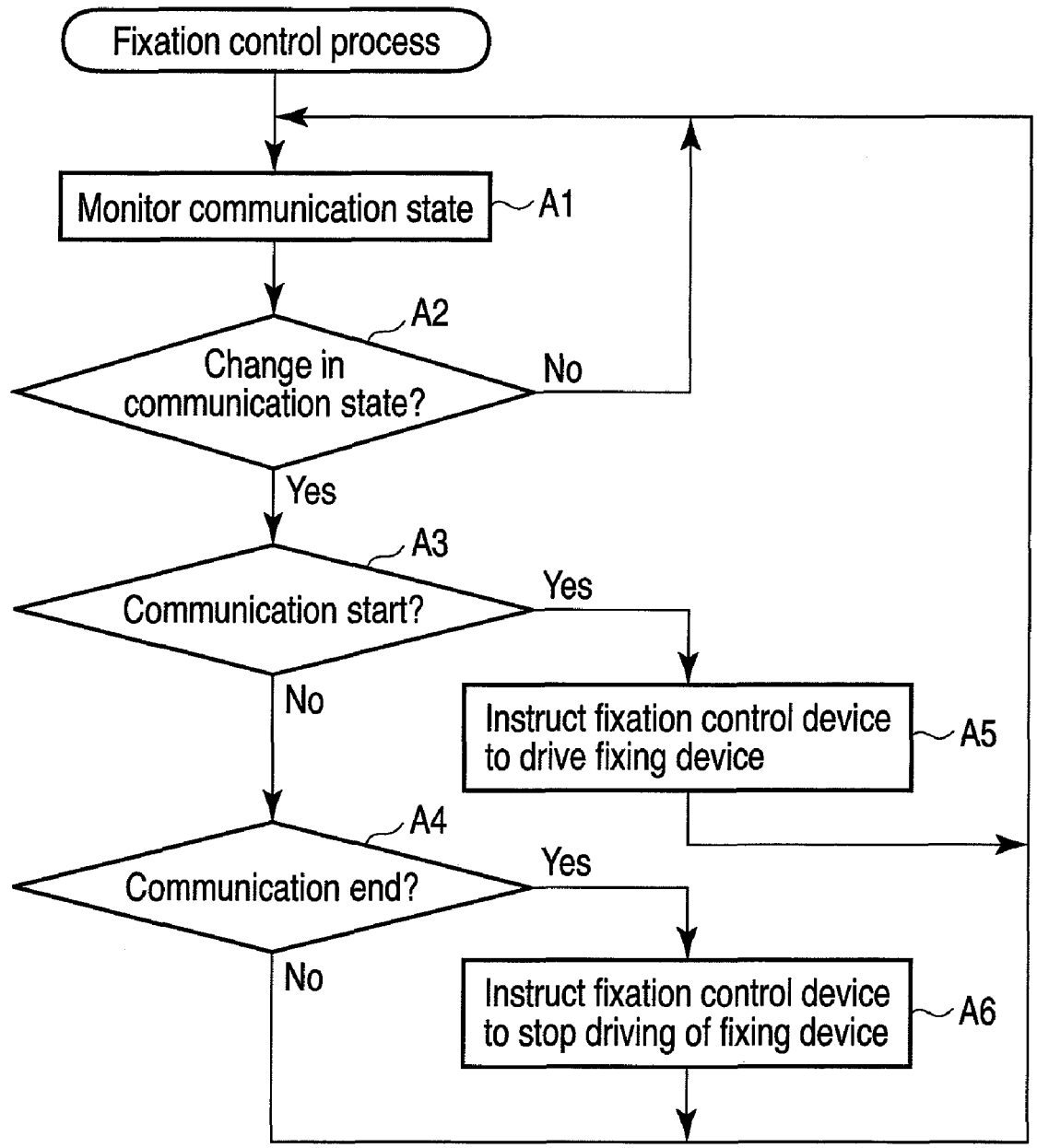
FIG. 7 is an exemplary flow chart illustrating the basic operation of a fixation control process in the embodiment.

To begin with, referring to a flow chart of FIG. 7, the basic operation of the fixation control process is described.

Assume now that the data communication module 40 is in the state in which data communication according to the user's request is enabled. For example, it is assumed that by the user's operation on the keyboard 13, the personal computer 10 is instructed to execute data transfer by close proximity wireless transfer, and a file that is the object of transfer is set. It is also assumed that the digital camera 25 at this time is not positioned near the personal computer 10.

The communication state detection module 42 monitors the communication state of data communication, which is executed by the data communication module 40 (block A1). In the case where there is no change in the communication state (No in block A2), the communication state detection module 42 continues monitoring of the communication state of communication by the data communication module 40 (block A1).

It is assumed that the digital camera 25 is positioned close to the personal computer 10 and the distance between the wireless communication antenna 21 of the personal computer 10 and the wireless communication antenna 26 of the digital camera 25 decreases to such a distance that close proximity wireless transfer is enabled. In this case, the data communication module 40 starts the operation of transferring the file that is the object of transfer, in accordance with a request for execution of preset close proximity wireless transfer.

On the other hand, if the communication state detection module 42 detects a change in the communication state (Yes in block A2) and if data communication is started, the communication state detection module 42 instructs the fixing device control module 38 to drive the fixing devices 22a and 22b (block A5).

The fixing devices 22a and 22b are driven by the fixing device control module 38, thereby generating magnetic force and functioning to attract the fixing devices 28a and 28b which are provided on the digital camera 25 that is positioned nearby. Similarly, with the digital camera 25 being positioned near the personal computer 10, the fixing devices 28a and 28b are driven to function to attract the fixing devices 22a and 22b of the personal computer 10.

As a result, as shown in FIG. 6, the personal computer 10 and the digital camera 25 are fixed in the state in which the wireless communication antenna 21 of the personal computer 10 is put in close contact with the wireless communication antenna 26 of the digital camera 25. The communication state detection module 42 returns to the state of monitoring the communication state (block A1).

On the other hand, if a change occurs in the communication state of data communication by the data communication module 40 (Yes in block A2) and this change is the end of communication (Yes in block A4), the communication state detection module 42 instructs the fixing device control module 38 to stop the driving of the fixing devices 22a and 22b, thereby to release the fixation by the fixing devices 22a and 22b (block A6).

Thus, the fixing state between the personal computer 10 and digital camera 25 is released, and the digital camera 25 can be separated from the personal computer 10.

In block A6, the fixing device control module 38 may not be instructed to stop the driving of the fixing devices 22a and 22b to completely release the fixed state. Instead, the fixing device control module 38 may be instructed to decrease the strength of fixation. Thereby, in the case where the data communication is executed in the state in which digital camera 25 is placed on the personal computer 10, it becomes possible to avoid such situation that the digital camera 25 would fall from the personal computer 10 by the release of the fixed state at the same time as the end of data communication.

As has been described above, in the fixation control process in the present embodiment, the state of data communication is monitored, and if the close proximity wireless transfer is started by the approach of the digital camera 25 to the personal computer 10, the fixing devices 22a and 22b are driven to fix the digital camera 25, which is the counterpart of communication and is positioned nearby, to the personal computer 10.

Figure 8:
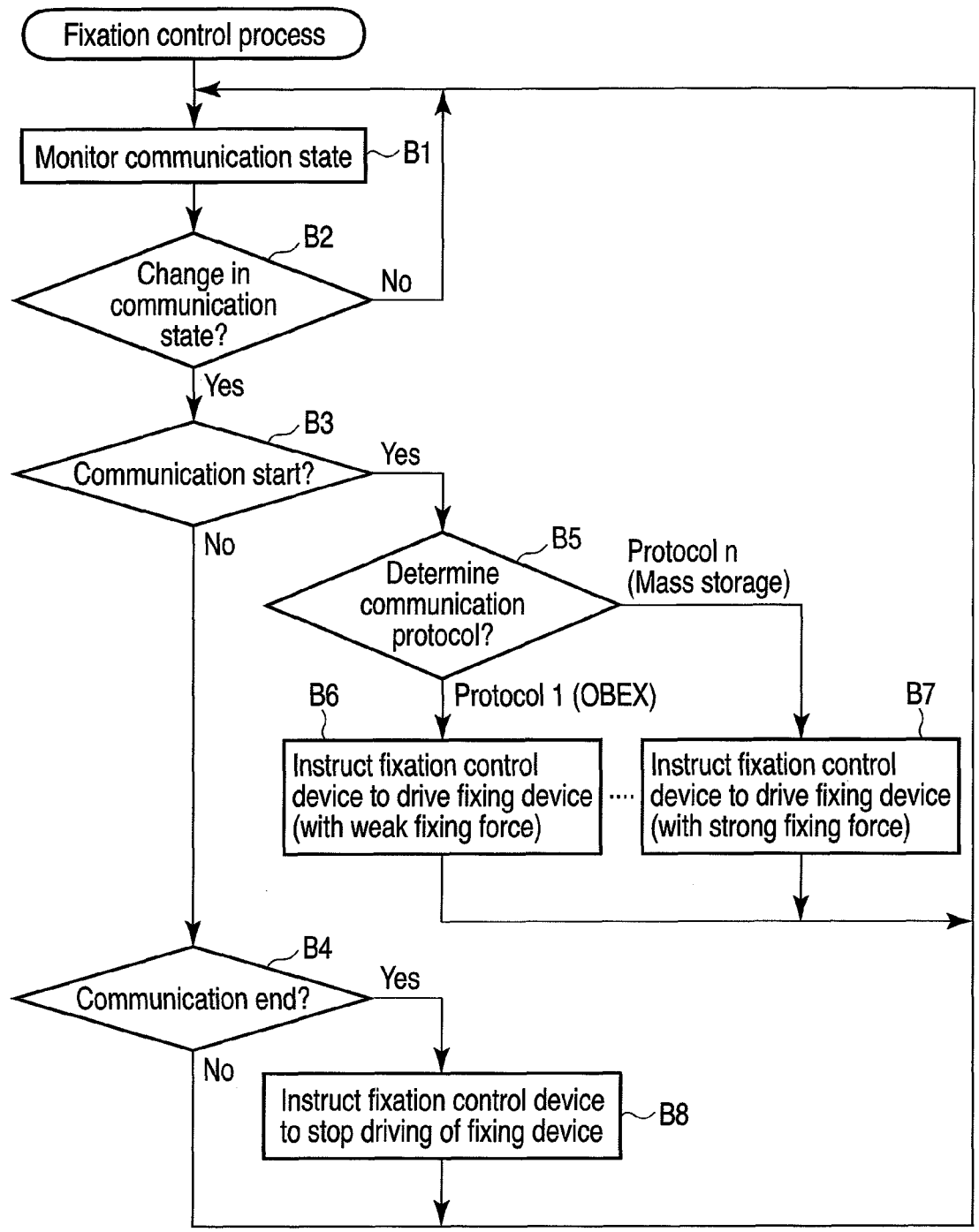
FIG. 8 is an exemplary flow chart illustrating the operation of the fixation control process in the case of controlling the driving of the fixing device according to a communication protocol in the embodiment.

Next, referring to a flow chart of FIG. 8, a description is given of the operation of the fixation control process in the case of controlling the driving of the fixing devices 22a and 22b in accordance with the communication protocol. Since the basic operation of the fixation control process in this example is the same as that shown in FIG. 7, only different process steps are described.

The data communication module 40 executes data communication in accordance with the communication protocol corresponding to the type of data communication which meets the user's request. For example, in the case where the execution of a file transfer process is requested, data communication is executed according to an OBEX protocol (protocol 1). On the other hand, in the case where data transfer of a large-capacity storage device is executed, data communication is executed in accordance with a communication protocol for large-scale data transfer (protocol n).

If the start of data communication is detected by the communication state detection module 42 (Yes in block B3), the communication protocol determination module 44 determines the communication protocol of the data communication which is executed by the data communication module 40 (block B5).

In the case where the communication protocol of the data communication by the data communication module 40 is the OBEX protocol, the communication protocol determination module 44 instructs the fixing device control module 38 to drive the fixing devices 22a and 22b. In this case, the communication protocol determination module 44 instructs the fixing device control module 38 to drive the fixing devices 22a and 22b in such a manner that the fixing force by the fixing devices 22a and 22b may become weak (block B6). It is assumed that the fixing force is preset in the communication protocol determination module 44 in association with each individual protocol. In this case, the communication protocol determination module 44 instructs the fixing device control module 38 to drive the fixing devices 22a and 22b in such a manner that the fixing devices 22a and 22b may have the fixing force that is preset in association with the OBEX protocol.

On the other hand, in the case where the communication protocol of the data communication by the data communication module 40 is the communication protocol for large-scale data transfer, the communication protocol determination module 44 instructs the fixing device control module 38 to drive the fixing devices 22a and 22b in such a manner that the fixing force by the fixing devices 22a and 22b may become strong (block B7).

If the communication is finished, the driving of the fixing devices 22a and 22b by the fixing device control module 38 is stopped in the same manner as described above, and the fixation by the fixing device 22a, 22b is released (block B4, B8).

As has been described above, the communication protocol of data communication which is executed by the close proximity wireless transfer is determined, and the strength of the fixing force of the fixing device 22a, 22b is controlled according to the communication protocol. Thereby, the condition of close proximity wireless transfer, which is optimal for the communication condition, can be secured. For example, in the case of executing large-scale data transfer, the electronic apparatus, which is the counterpart of communication, is strongly fixed to the own apparatus by the fixing devices 22a and 22b. Thereby, the user can be provided with the environment which avoids file damage due to abrupt communication cutoff.

Figure 9:
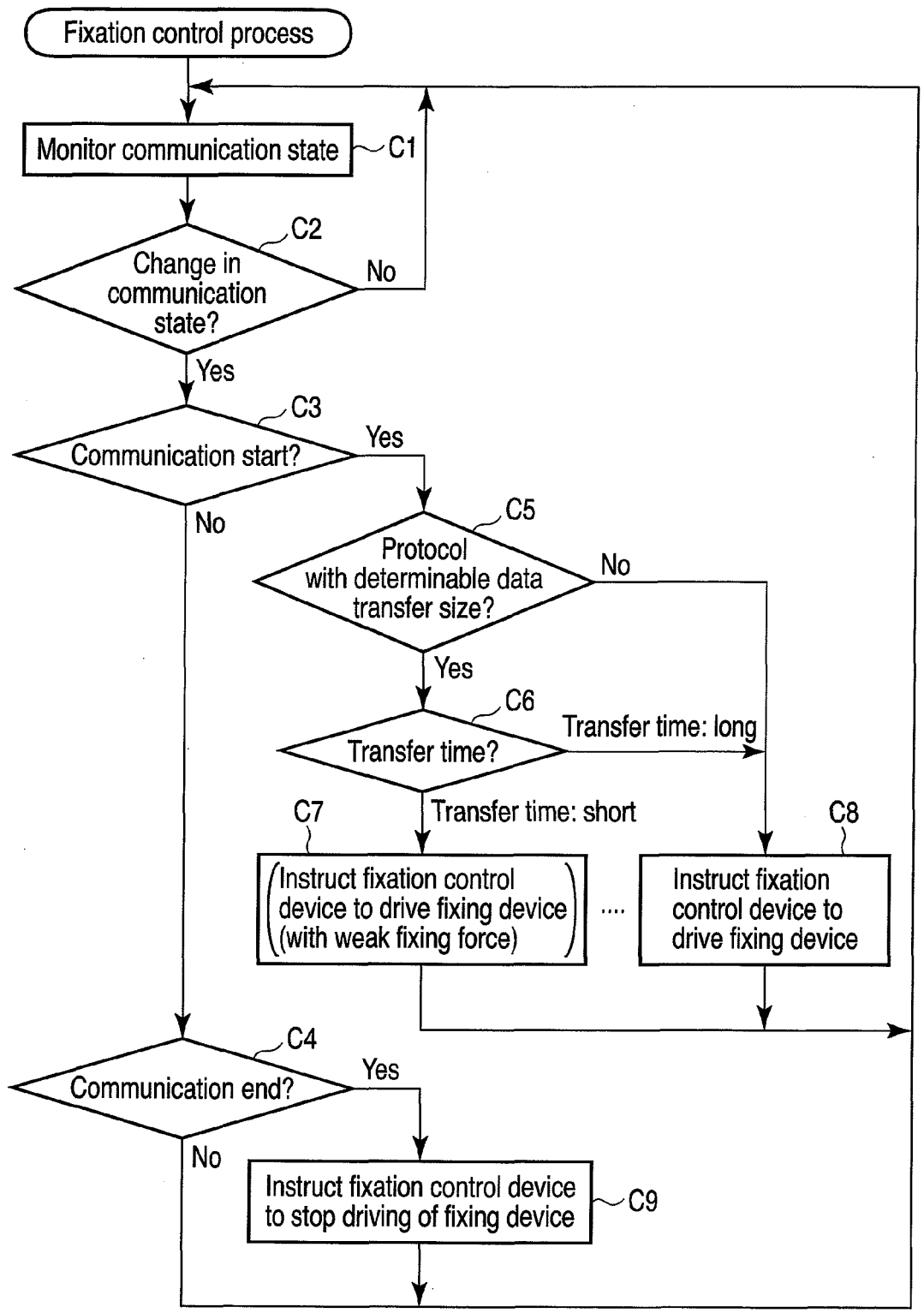
FIG. 9 is an exemplary flow chart illustrating the operation of the fixation control process in the case of controlling the driving of the fixing device according to a transfer time of data transfer in the embodiment.

Next, referring to a flow chart of FIG. 9, a description is given of the operation of the fixation control process in the case of controlling the driving of the fixing devices 22a and 22b in accordance with the transfer time (communication time) of data transfer. Since the basic operation of the fixation control process in this example is the same as that shown in FIG. 7, only different process steps are described.

The data communication module 40 executes data communication in accordance with the communication protocol corresponding to the type of data communication which meets the user's request.

If the start of data communication is detected by the communication state detection module 42 (Yes in block C3), the transfer time determination module 46 determines whether the communication protocol of the data communication that is executed by the data communication module 40 is a protocol in which the data transfer size can be determined. In the case of a protocol in which the data transfer size cannot be determined (No in block C5), the transfer time determination module 46 instructs the fixing device control module 38 to drive the fixing devices 22a and 22b (block C8).

On the other hand, in the case of a protocol in which the data transfer size can be determined, the transfer time determination module 46 acquires the data transfer size from the data communication module 40, and determines the transfer time. If the transfer time is shorter than a preset reference time ("transfer time: short" in block C6), the transfer time determination module 46 does not instruct the fixing device control module 38 to drive the fixing devices 22a and 22b. Specifically, even if the digital camera 25 is positioned near the personal computer 10, the digital camera 25 is not fixed to the personal computer 10.

In the meantime, in order to guide the wireless communication antenna 26 of the digital camera 25 to the wireless communication antenna 21, the fixation control function 41 may instruct the fixing device control module 38 to drive the fixing devices 22a and 22b in such a manner that the fixing force by the fixing devices 22a and 22b may become weak (block C7).

In the case where the transfer time is not shorter than the preset reference time ("transfer time: long" in block C6), the transfer time determination module 46 instructs the fixing device control module 38 to drive the fixing devices 22a and 22b.

If the communication is finished, the driving of the fixing devices 22a and 22b by the fixing device control module 38 is stopped in the same manner as described above, and the fixation by the fixing device 22a, 22b is released (block C4, C9).

As has been described above, in the communication condition in which the data transfer time is short, the digital camera 25 is not fixed to the personal computer 10. Thereby, the user can easily perform the operation of positioning the digital camera 25 near the personal computer 10, and can complete the data transfer. In the communication condition in which the data transfer time is long, the data communication is executed in the state in which the digital camera 25 is fixed to the personal computer 10 by the fixing devices 22a and 22b, and thereby it is possible to avoid file damage due to abrupt communication cutoff.

In the above description, the fixation control processes, which are illustrated in the flow charts of FIG. 8 and FIG. 9, have been individually described. However, both fixation control processes can be executed in combination.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   an antenna configured to execute close proximity wireless transfer;
   an attaching module near the antenna configured to attach a second apparatus to the apparatus;
   a data communication module configured to communicate data with the second apparatus by close proximity wireless transfer via the antenna;
   a communication state detection module configured to detect a communication state of the data of the data communication module; and
   an attachment controller configured to control attachment of the second apparatus by the attaching module in accordance with the detected communication state by the communication state detection module.

2. The electronic apparatus of claim 1, wherein the communication state detection module is configured to detect a start and an end of communication with the second apparatus, and the attachment controller is configured to control the attachment by the attaching module in accordance with the start and the end of the communication detected by the communication state detection module.

3. The electronic apparatus of claim 2, wherein the attachment controller is configured to start the attachment by the attaching module in accordance with the start of the communication detected by the communication state detection module, and to loosen the attachment by the attaching module in accordance with the end of the communication.

4. The electronic apparatus of claim 2, further comprising a communication determination module configured to determine a type of the data communication by the data communication module,
   wherein the attachment controller is configured to control strength of the attachment by the attaching module in accordance with a communication protocol determined by the communication determination module.

5. The electronic apparatus of claim 2, further comprising a communication time determination module configured to determine a duration for the data communication by the data communication module,
   wherein the attachment controller is configured to control the attachment of the second apparatus by the attaching module in accordance with a communication duration determined by the communication time determination module.

6. The electronic apparatus of claim 5, wherein the attachment controller is configured not to attach the second apparatus by the attaching module when the communication time determined by the communication time determination module is shorter than a preset reference time, and configured to attach the second apparatus by the attaching module when the communication time is equal to or longer than the preset reference time.

7. The electronic apparatus of claim 1, wherein the antenna is on a casing of the apparatus, and between a plurality of the attaching modules.

8. An attachment control method in an electronic apparatus comprising an attaching module near an antenna for close proximity wireless transfer configured to attach a second apparatus to the apparatus, the method comprising:
   detecting a communication state of data communication with the second apparatus by close proximity wireless transfer via the antenna; and
   controlling attachment of the second apparatus by the attaching module in accordance with the detected communication state.

9. The attachment control method of claim 8, further comprising:
   determining a type of the data communication with the second apparatus; and
   controlling strength of the attachment by the attaching module in accordance with the determined type of the data communication.

10. The attachment control method of claim 8, further comprising:
    determining a duration for the data communication with the second apparatus; and
    controlling the attachment of the second apparatus in accordance with the determined duration of the data communication.

* * * * *